United States Patent [19]

Ichikawa

[11] Patent Number: 5,026,164
[45] Date of Patent: Jun. 25, 1991

[54] OPTICAL ENCODER

[75] Inventor: Souji Ichikawa, Sagamihara, Japan

[73] Assignee: Mitutoyo Corporation, Tokyo, Japan

[21] Appl. No.: 308,465

[22] Filed: Feb. 10, 1989

[30] Foreign Application Priority Data

Feb. 22, 1988 [JP] Japan .............................. 63-22031[U]
Oct. 4, 1988 [JP] Japan ............................ 63-130027[U]

[51] Int. Cl.$^5$ ........................ G01B 11/14; H01J 40/14
[52] U.S. Cl. ................................. 356/373; 250/237 G
[58] Field of Search .............................. 356/373, 374; 250/237 G; 33/707

[56] References Cited

U.S. PATENT DOCUMENTS

| 3,768,911 | 10/1973 | Erickson | 356/169 |
| 3,812,352 | 5/1974 | MacGovern | 250/237 G |
| 4,049,965 | 9/1977 | Pettigrew | 250/237 |
| 4,079,252 | 3/1978 | Brake | 356/374 |

FOREIGN PATENT DOCUMENTS

| 0157115 | 9/1982 | Japan | 250/237 G |
| 2024416 | 1/1980 | United Kingdom . | |
| 2095399 | 9/1982 | United Kingdom | 356/373 |
| 2195179 | 9/1986 | United Kingdom . | |
| 07944A1 | 6/1986 | World Int. Prop. O. . | |

*Primary Examiner*—F. L. Evans
*Assistant Examiner*—K. P. Hantis
*Attorney, Agent, or Firm*—Oliff & Berridge

[57] ABSTRACT

In an optical encoder of a three grating system, a pitch P2 of a second grating for illuminating a first grating is set at a value larger than a pitch P1 of the first grating and a length of a light transmitting portion of the second grating is set at a value smaller than or equal to the length of the pitch P1. With this arrangement, the incoherency between illuminating lights transmitted through the second grating is improved and an SN ratio of a detection signal is raised. Further, when the reflection type optical encoder is to be realized by use of the three grating system, the second grating and third grating are formed separatedly on the second scale at positions different from each other, and further, a plurality of the third gratings different in phase from each other are formed, so that a plurality of light receiving signals different in phase from one another can be obtained. With this arrangement, the reflection type optical encoder of a desirable three grating systems can be realized.

4 Claims, 9 Drawing Sheets

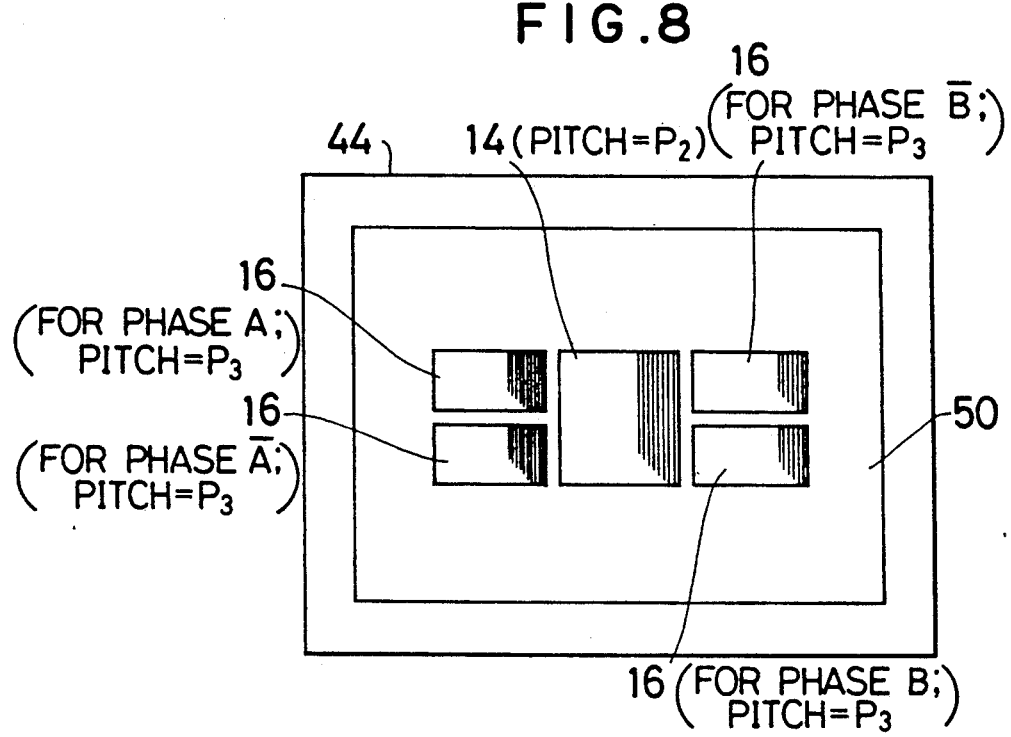
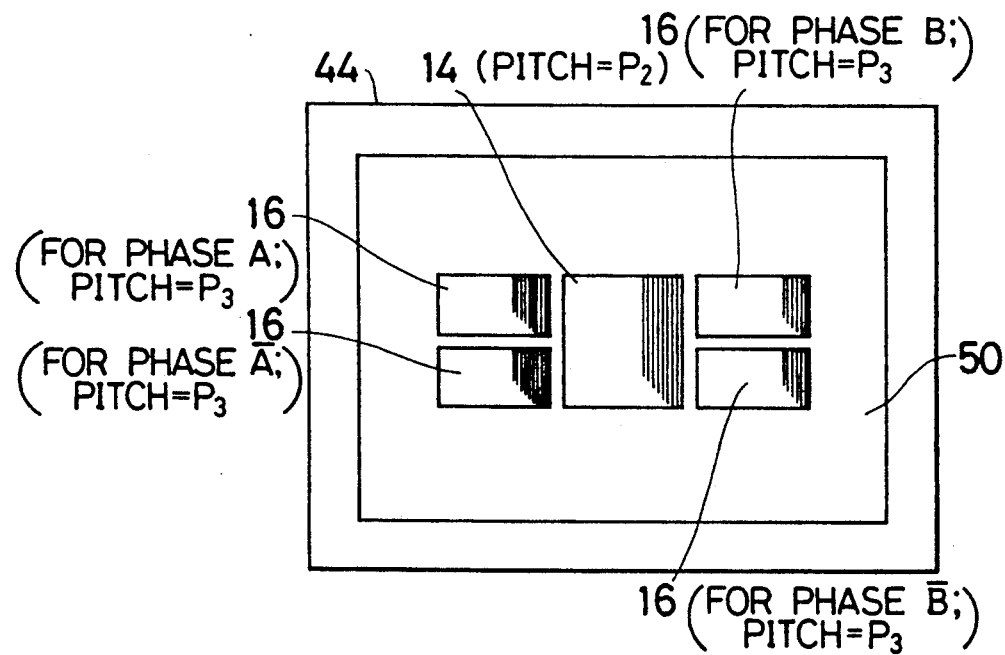

OPTICAL ENCODER

BACKGROUND OF THE INVENTION

1. Field of the Invention

This invention relates to optical encoders. More particularly, this invention relates to a so-called three grating type optical encoder including: three (in a case of a transmission type encoder) or two (in a case of a reflection type encoder) scales each formed with periodic gratings of three types: a light source for illuminating the gratings of the three types; and a light receiving element for detecting an illuminating light restricted by the gratings of the three types; wherein a periodic detection signal is produced in accordance with a relative displacement between two members.

2. Description of the Prior Art

In a machine tool and the like, as a device for measuring a relative displacement between a stationary member and a movable member, there are known displacement measuring devices including an optical encoder for producing a periodic detection signal in accordance with a relative displacement and a counter for turning the detection signals into pulses, counting and integrating the same.

As the optical encoder, in addition to a conventional encoder wherein changes in overlapping of gratings of two types is utilized, there is known a so-called three grating system, wherein changes in overlapping of gratings of three types 12, 14 and 16 are utilized, as shown in FIG. 11. The main principle of this three grating system is shown in Journal of the Optical Society of America, 1965, vol. 55, No. 4, pp 373–381 for example, and disclosed in U.S. Pat. No. 3,812,352 and British Patent Application No. 44522/74, in imperfect forms though.

FIG. 11 is the system disclosed in Society of Photo-Optical Instrumentation Engineers (SPIE), Vol. 136, 1st European Congress on Optics Applied to Metrology (1977), pp 325–331.

To simplify, as shown in FIG. 11, this three grating system includes: a first grating 12 of a grating pitch P1; a second grating 14 of a grating pitch P2, which is provided at a position spaced a distance u apart from the first grating 12; a third grating 16 of a grating pitch P3, which is provided at a position spaced a distance v apart from the first grating 12 as opposed to the second grating 14; a light source 18 for emitting a diffusive illuminating light in directions of the first and third gratings 12 and 16 through the second grating 14; a light receiving element 20 provided behind the third grating 16, for detecting an illuminating light restricted by the first to third gratings 12, 14 and 16 and photoelectrically transducing the same; and a preamplifier 22 for amplifying a signal from the light receiving element 20 and turning the same into a detection signal a; and, when the first grating 12 is displaced in a direction x, the detection signal a periodically changes as a substantial sine wave.

Incidentally, the relationship between the pitches of the aforesaid parameters P1, P2, P3, u, v and detection signal a is divided into two including a geometric system and a diffractive system for the definition, as shown in Table 1. In Table 1, 1 is a natural number and λ is an effective wave length of the illuminating light.

TABLE 1

|  | Geometric System | Diffractive System |
|---|---|---|
| P1 | P1 | P1 |
| P2 | $\{(u + v) / v\}$ P1 | $\{(u + v) / v\}$ (P1 / 2) |
| P3 | $\{(u + v) / u\}$ P1 | $\{(u + v) / u\}$ (P1 / 2) |
| u | u | u |
| v | $\approx (lu P1^2) / (\lambda u - lP1^2)$ <br> (l = Integer of l ≧ 1) |  |
| pitch of detection signal | P1 | P1 / 2 (optically divided into two) |

With the conventional three grating system as described above, in the case of the geometric system for example, if a length of a dark portion of the first grating 12 = a length of a light portion = 10 μm, the pitch P1 = 20 μm and the grating gap u = v ≈ 5 mm for example, then it is known that the pitch P2 of the second grating 14 becomes $$\{(u+v)/v\} P1 = 40 \mu m,$$

and the pitch P3 of the third grating 16 becomes $$\{(u+v)/u\} P1 = 40 \mu m.$$

Furthermore, in the case of the diffractive system, if a length of a dark portion of the first grating 12 = a length of a light portion = 20 μm, the pitch P1 = 40 μm and the grating gap u = v ≈ 5 mm for example, it is known that the pitch P2 of the second grating 14 becomes $$\{(u+v)/u\} (P1/2) = 40 \mu m,$$

and the pitch P3 of the third grating 16 becomes $$\{(u+v)/u\} (P1/2) = 40 \mu m,$$

However, with the conventional three grating system, as shown in FIG. 12, although a direct current component DC of the detection signal a is sufficiently provided, an alternate current component PP of the periodic signal is low, so that an SN ratio required in an electric circuit in the latter stage cannot be fully satisfied.

According to the experiments conducted by the inventor, on eleven samples by the conventional method, in each of which, with the aforesaid geometric system, the grating pitch P1 = 20 μm, P2 = 40 μm, P3 = 40 μm, the grating gap u = v ≈ 5 mm, and all of the gratings had the equal lengths of light portions and the dark portions, the SN ratios defined by the following equation were 12% at the lowest, 17% at the highest and 14.7% at an average, so that no satisfactory SN ratio was obtained.

$$SN \text{ ratio} = (PP/DC) \times 100\% \quad (1)$$

Furthermore, in the case of the conventional method, in which, with the aforesaid diffractive system, the grating pitch P1 = 40 μm, P2 = 'μm, P3 = 40 μm, the grating gap u = v ≈ 5 mm, and all of the gratings had the equal lengths of the light portions and the dark portions, it was made clear that data thus obtained were the substantially same as above, so that no satisfactory SN ratio was obtained.

Further, when a reflection type encoder is to be realized with the three grating system, if merely the first grating 12 is formed on a reflection type main scale, and the second grating 14 and the third grating 16 on the index scale are commonly used, then the grating pitch P2=P3, thereby presenting the disadvantage that P2 and P3 cannot be changed in pitch from each other.

SUMMARY OF THE INVENTION

The present invention has been developed to obviate the above-described disadvantages of the prior art and has as its first object the provision of an optical encoder wherein a detection signal satisfactorily high in SN ratio can be obtained, so that measurement with high accuracy can be performed.

It is a second object of the present invention to provide a reflection type optical encoder wherein the pitches P2 and P3 of the second and third gratings which are formed on one and the same scale (index scale) in the case of the reflection type optical encoder can be set at values different from each other, so that the degree of freedom in design can be improved.

To achieve the first object, according to the present invention, in an optical encoder comprising:

a first scale fixed to one of members relatively movable and formed with a first grating;

a light source for emitting an uncollimated illuminating light; a second scale formed with a second grating for partially shielding the illuminating light from the light source and illuminating the first grating; a third scale formed with a third grating for further restricting the illuminating light which has been restricted by the second and the first grating; and a light receiving element for detecting the illuminating light which has been restricted by the first to third grating; all fixed to the other of members relatively movable, wherein a relative displacement between the both members is detected from a periodic variation of a detection signal from the light receiving element, a pitch P2 of the second grating is set at a value larger than a pitch P1 of the first grating and a length of a light transmitting portion of the second grating is set at a value smaller than or equal to the length of the pitch P1 of the first grating.

To achieve the second object, according to the present invention, in a reflection type optical encoder comprising:

a reflection type first scale fixed to one of members relatively movable and formed with a first grating;

a light source for emitting an uncollimated illuminating light; a second scale formed with a second grating for partially shielding the illuminating light from the light source and illuminating the first grating, and a plurality of third gratings different in phase from one another and separated from the second grating, for further restricting the illuminating light which has been restricted by the second and the first gratings; and a plurality of light receiving elements for detecting the illuminating light which has been restricted by the first to the respective third gratings, respectively; all fixed to the other of members relatively movable, wherein a relative displacement between the both members is detected from a periodic variation of detection signals from the light receiving elements.

According to the present invention, in the optical encoder of the three grating system as described above, the pitch P2 of the second grating for illuminating the first grating is set at the value larger than the pitch P1 of the first grating and the length of the light transmitting portion (light portion) is set at the value smaller than or equal to the length of the pitch P1 of the first grating, so that the incoherency between the illuminating lights transmitted through the second grating is improved and the SN ratio of the detection signal is raised. Consequently, the signal process in the latter stage is facilitated and the detection of displacement with high accuracy can be performed.

More specifically, in FIG. 1, it is preferable that incoherent secondary light sources having as little as possible relationships with one another are formed on light portions 14B1, 14B2, ... 14Bn of the second grating 14. In other words, it is ideal that the secondary light sources formed on the aforesaid light portions 14B1, 14B2 ... 14Bn are the secondary light sources incoherent from one another. However, if the second grating 14 is illuminated by use of a light emitting diode (LED) or a lamp as a primary light source 18, then, when the intervals between the light portions 14B are small, it is difficult to make the secondary light sources incoherent from one another, and, when the first grating 12 is relatively moved, the SN ratio of the detection signal of the light receiving element 20 is deteriorated. Therefore, according to the present invention, the pitch P2 of the second grating 14 is set at the value larger than the pitch P1 of the first grating 12 and the length of the light portion 14B of the second grating 14 is set at the value smaller than or equal to the length of the pitch P1 of the first grating 12, so that the intervals between the light portions 14B are increased, thereby improving the incoherency between the secondary light sources.

More specifically, when the pitch P2 of the second grating 14 is larger than the pitch P1 of the first grating 12, the diffusion properties (degree of inclined illumination) of the light illuminating the first grating 12 are increased. Furthermore, when the light portion 14B of the second grating 14 is small, the light portion 14B comes to be close to the point light source, whereby the light source becomes highly diffusive. In consequence, it is desirable that the light portion 14B of the second grating 14 is equal to the length of the pitch P1 of the first grating 12 or smaller than it. The first grating 12 is illuminated by the thus highly diffusive light, whereby the signal component PP becomes large as compared with the direct current component DC, so that the SN ratio is improved in particular.

According to the present invention, when these relationships are represented by general formulae, respectively, as shown below, a grating image according to the geometric system can be detected.

$$P2 \geq ((u+v)/v) \cdot m1 \cdot P1 \geq P1 \quad (1)$$

$$P3 \geq ((u+v)/u) \cdot n1 \cdot P1 \quad (2)$$

$$\text{Length of light portion of second grating} = \text{length of pitch } P1 \text{ of first grating} \quad (3)$$

$$u = v = d \quad (4)$$

(in the case of reflection type) or $$v = 1uP1^2/(\lambda u - 1P1^2) \quad (5)$$

(in the case of transmission type).

Here, m1 is a positive integer larger than 1, and it is preferable that n1 is a positive integer larger than 1, i.e. a natural number, 1 is a natural number.

Further, when the above relationships are represented by general formulae, respectively, as shown below, a grating image according to the different system can be detected.

$$P2 \geq ((u+v)/v) \cdot m2 \cdot P1/2 \geq P1 \quad (6)$$

$$P3 \geq ((u+v)/u) \cdot n2 \cdot P1/2 \quad (7)$$

Length of light portion of second grating ≦ length of pitch P1 of first grating  (8)

$$u = v = d \quad (9)$$

(in the case of reflection type) or $$v = 1uP1^2/(\lambda u - 1P1^2) \quad (10)$$

(in the case of transmission type).

Here, m2 is a positive integer larger than 1, and it is preferable that n2 is a positive odd number larger than 1.

According to the experiments conducted by the inventor, the optimum range of ratio between the length of a light shielding portion 14A and the light transmitting portion 14B of the second grating 14 was 3:1 to 7:1.

Furthermore, according to the experiments conducted by the inventor, when the SN ratios were measured, as in the conventional example, on eleven samples in each of which, with the geometric system, as shown in FIG. 1, the grating pitch P1 of the first grating 12=20 μm (the length of the light portion 12B=the length of the dark portion 12A=10 μm), the grating pitch P2 of the second grating 14=80 μm (this was twice that of the conventional method, and the length of the light portion 14B was 20 μm and the length of the dark portion 14A was 60 μm), the grating pitch P3 of the third grating 16=40 μm (the length of the light portion=the length of the dark portion=20 μm) and the grating gap u=v ≈5 mm. The SN ratio was 25% at the lowest, 35% at the highest and 30.4% at an average, so that it was ascertained that the SN ratio was improved to a value about twice that of the conventional example.

In a case where, with the diffractive system, as shown in FIG. 2, the grating pitch P1 of the first grating 12=40 μm (the length of the light portion 12B=the length of the dark portion 12A=20 μm), the grating pitch P2 of the second grating 14=80 μm (this was twice that of the conventional method, and the length of the light portion 14B was 20 μm and the length of dark portion 14A was 60 μm), the grating pitch P3 of the third grating 16=40 μm (the length of the light portion=the length of the dark portion=20 μm), and the grating gap u=v≈5 mm, the substantially same data as with the geometric system were obtained.

Incidentally, according to the present invention, the light source 18 and the second grating 14 need not necessarily be separated from each other, and, as shown in FIG. 3, an array shaped light source 30 in which the light sources and the second grating are integrated with each other can be used. In this case, the construction can be simplified.

Furthermore, the third grating 16 and the light receiving elements 20 need not necessarily be separated from each other, and, as shown in FIG. 4, an array shaped light receiving element 32 in which the third grating and the light receiving elements are integrated with each other can be used. In this case also, the construction can be simplified.

Additionally, both the array shaped light source 30 and the array shaped light receiving element 32 can be used at the same time. In this case, the construction can be further simplified.

Further, when the reflection type encoder is to be realized by use of the three grating system, if only the first grating 12 is formed on a reflection type first scale, and the second grating 14 and the third grating 16 on the second (the third) scale are commonly used, then the grating pitch P2=P3, so that P2 and P3 cannot be changed in value to each other. Consequently, the second grating 14 and the third grating 16 are formed separately from each other on the second scale at positions different from each other, and further, a plurality of the third gratings 16 different in phase from one another are formed, so that a plurality of light receiving signals different in phase from one another can be obtained.

With the above-described arrangement, even with the reflection type encoder, the grating pitches P2 and P3 can be set at values different from each other, so that the degree of freedom is design can be increased.

Furthermore, the reflection type encoder of a desirable three grating system can be realized, the encoder can be rendered compact in size as compared with the transmission type, and can be easily mounted on the member to be measured.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIGS. 8 and 9 are sectional views similar to FIG. 7, showing another disposition of the second and the third gratings in the above embodiment;

DESCRIPTION OF THE BEST MODE

The embodiment of the present invention will hereunder be described with reference to the accompanying drawings.

Figure 1:
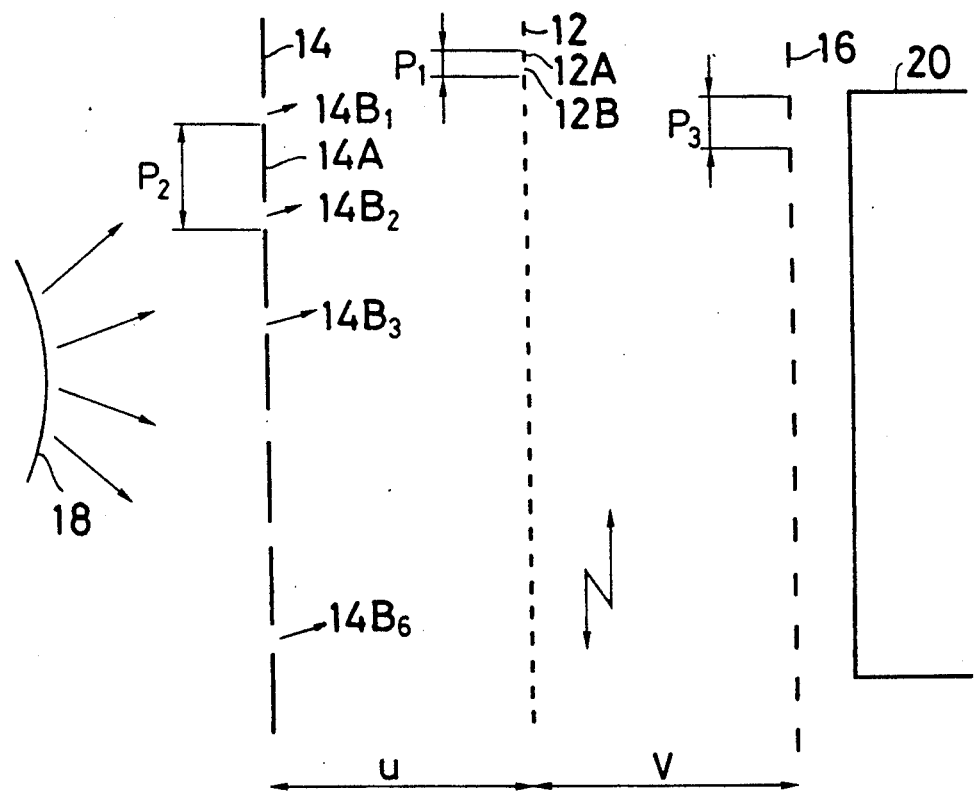
FIG. 1 is a schamatic view of an example in which the present invention is applied to the optical encoder of the geometric system.
Figure 2:
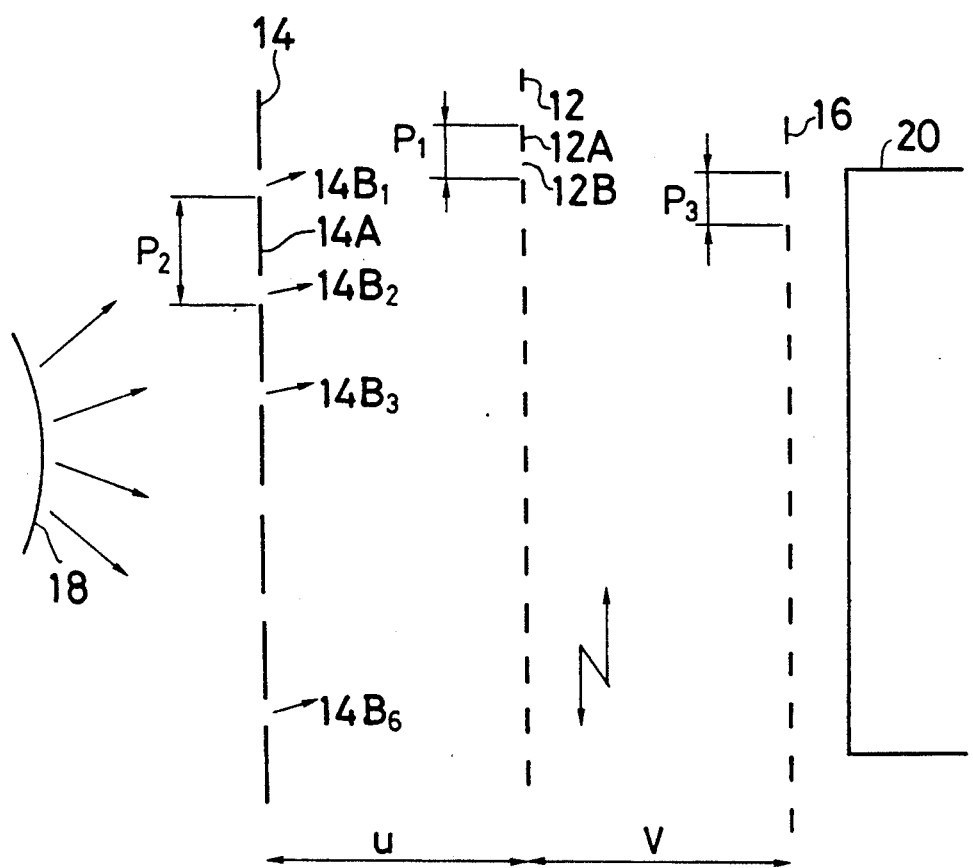
FIG. 2 is a schematic view of an example in which the present invention is applied to the optical encoder of the diffractive system.
Figure 3:
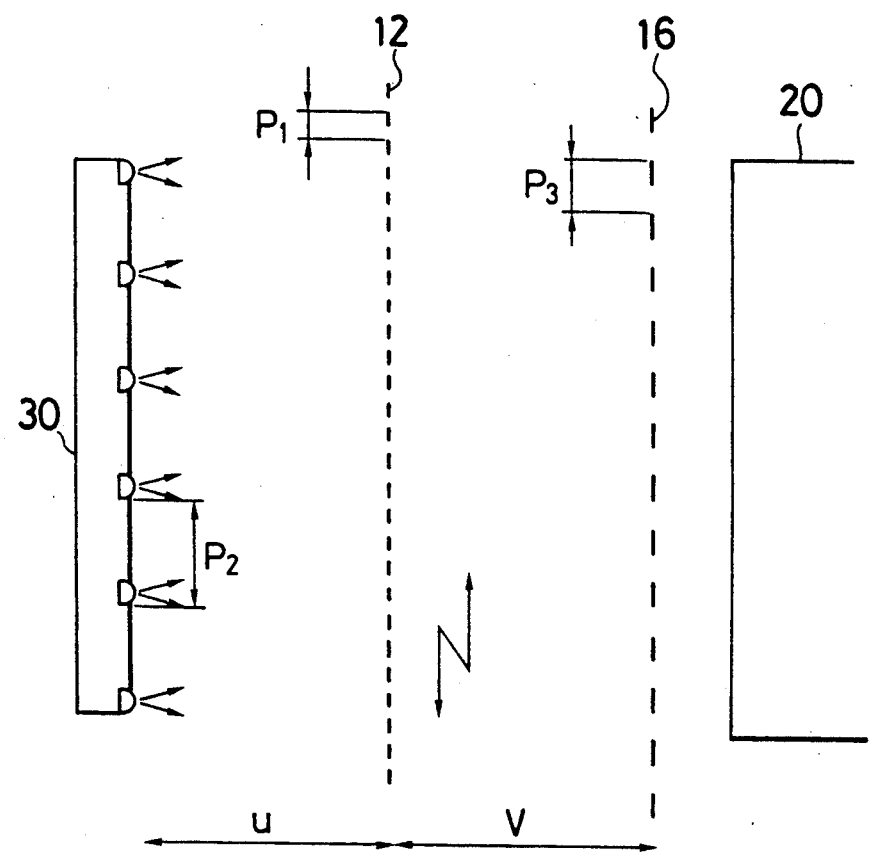
FIG. 3 is a schematic view of an example in which the array shaped light source is used.
Figure 4:
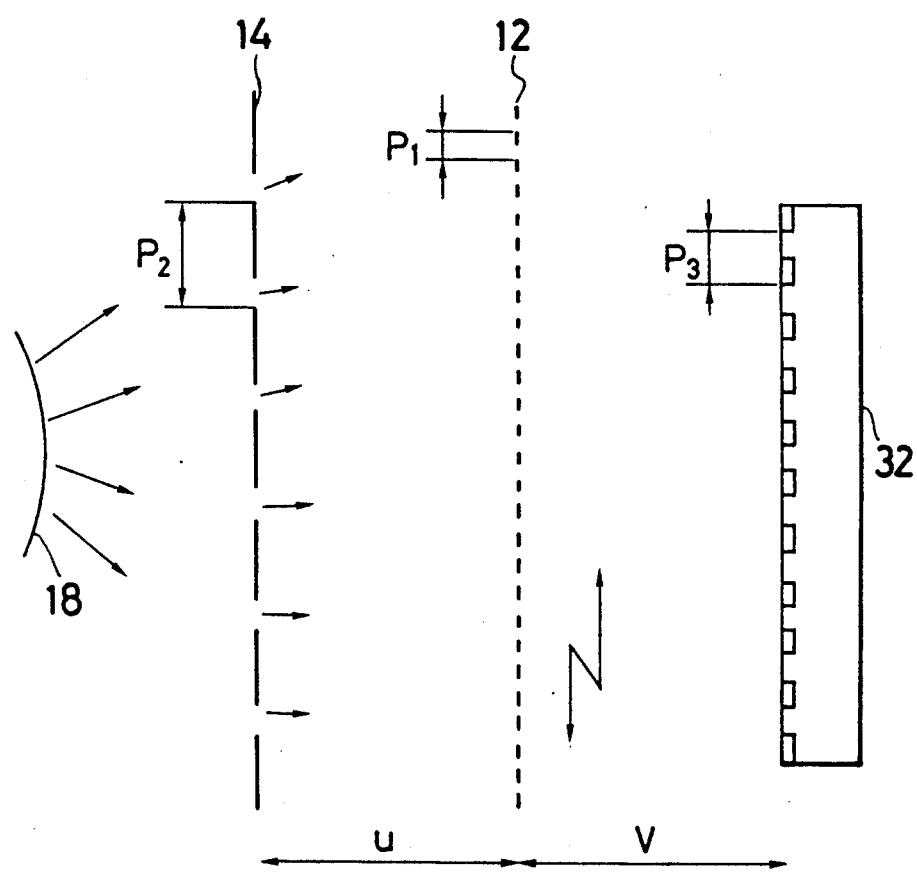
FIG. 4 is a schematic view of an example in which the array shaped light receiving element is used.
Figure 5:
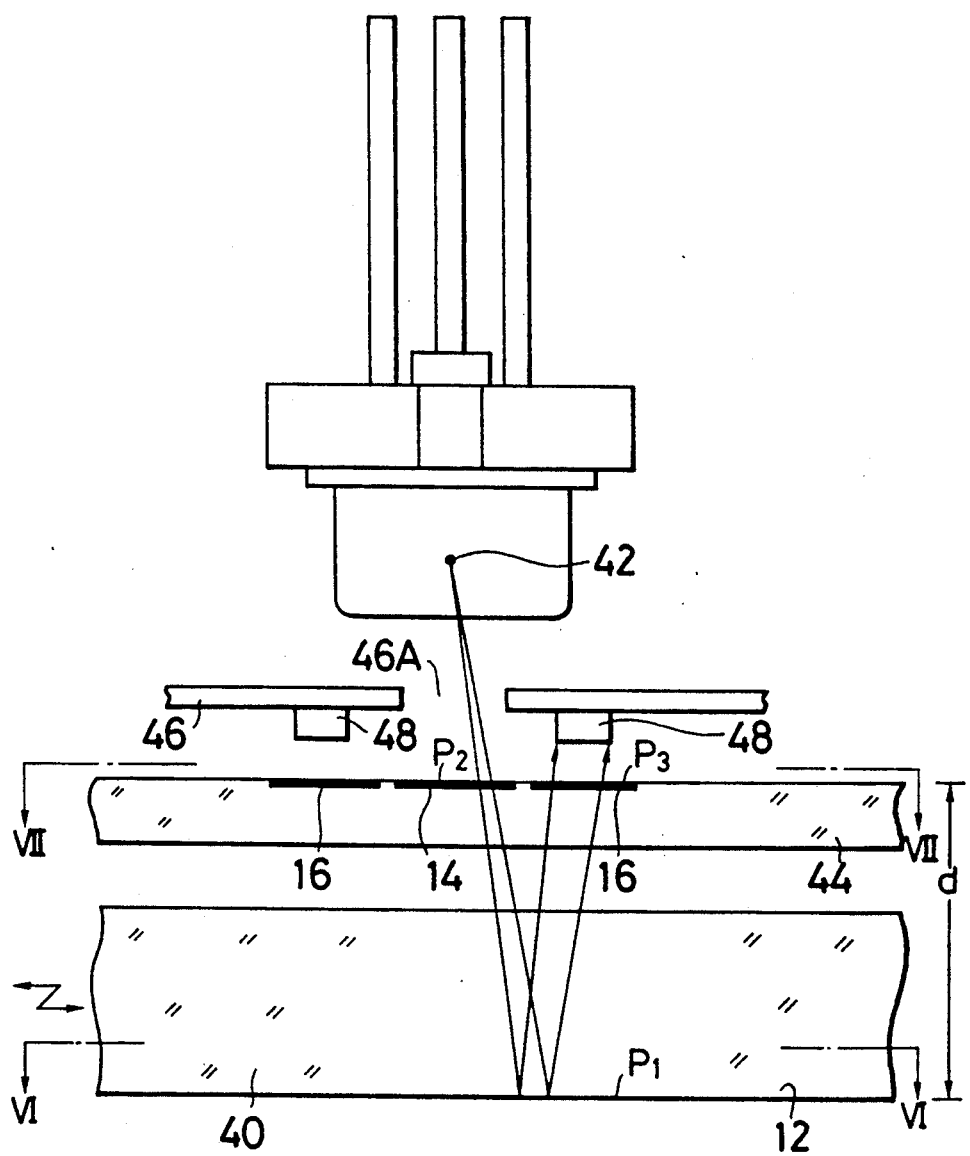
FIG. 5 is a sectional view showing the arrangement of the essential portion of an embodiment of the optical encoder according to the present invention.

The first embodiment shows that the present invention is applied to the reflection type optical encoder of the geometric system. As shown in FIG. 5, the reflection type optical encoder according to the first embodiment comprises:

a main scale 40 made of glass as being a first scale formed at the undersurface thereof in the drawing with a first grating 12 of a pitch P1, said main scale being fixed to one of members relatively movable;

a light source 42 formed of an LED or a lamp for emitting an uncollimated illuminating light (wave length $\lambda \approx 0.8$ $\mu$m); an index scale 44 made of glass as being a second and a third scales which are commonly used, and formed of opposite sides of the top surface thereof with a second grating 14 of a pitch P2, for partially shielding the illuminating light from the light source 42 and illuminating the first grating 12 on the main scale 40 and third gratings 16 of a pitch P3 for further restricting the illuminating light which has been restricted by the second and the first gratings 14 and 12 in such a manner that the third gratings 16 are interposed between the second grating 14 and light receiving elements 48 for detecting the illuminating light which has been restricted by the first to the respective third gratings 12, 14 and 16, said light receiving elements being fixed as opposed to the third gratings 16 under opening members 46, as shown, between which an opening 46A for passing the illuminating light from the light source 42 is formed; all fixed to the other of members relatively movable.

Figure 6:
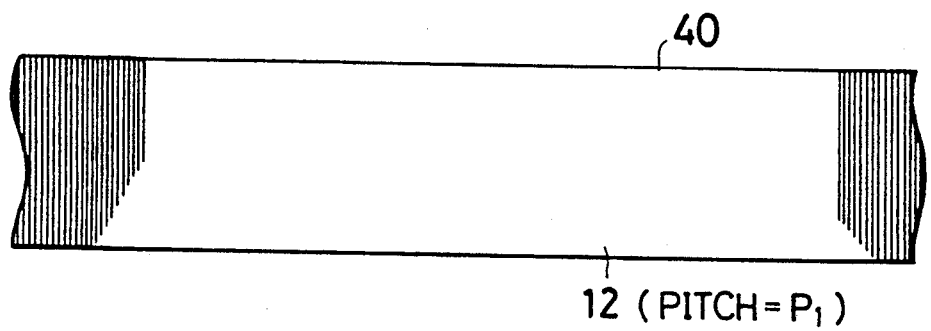
FIG. 6 is a sectional view taken along the line VI—VI in FIG. 5, showing the form of the first grating of the above embodiment.

As shown in FIG. 6, the first grating 12 is formed of a longitudinal fringe shaped graduation of the pitch P1, which is provided on the undersurface of the main scale 40.

Figure 7:
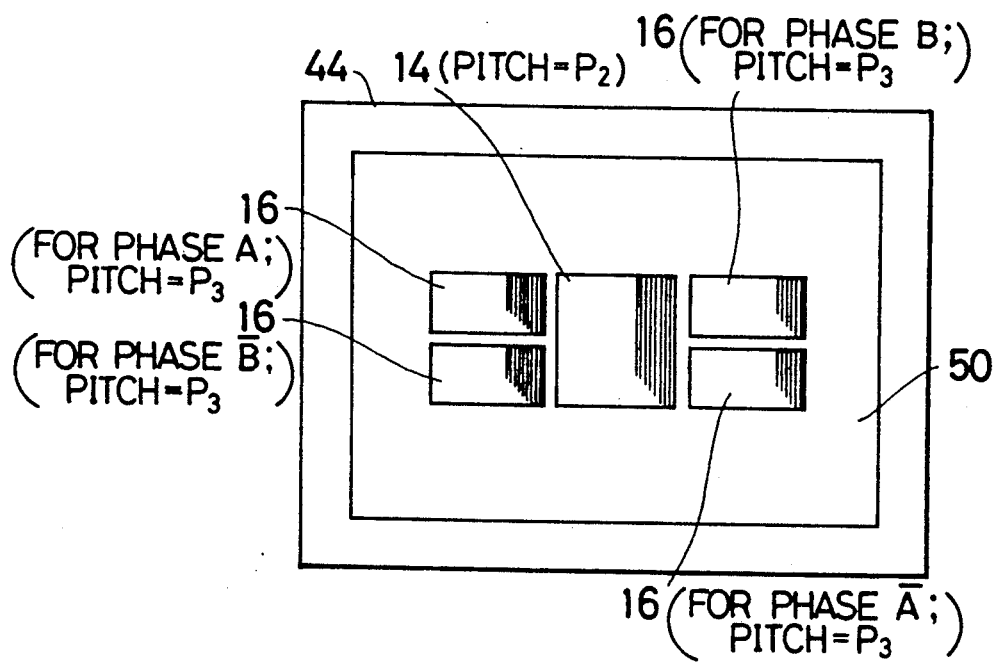
FIG. 7 is a sectional view taken along the line VII—VII in FIG. 5, showing a disposition of the second and the third gratings in the above embodiment.

As shown in FIG. 7 in detail, the second grating 14 and the third gratings 16 are arranged such that the second grating 14 of the pitch P2 for forming a plurality of linear light sources is formed at the center of the index scale 44, the four third gratings 16 of the pitch P3 each having a phase A, a phase B, a phase $\overline{A}$ or a phase $\overline{B}$ and being shifted by 90° in phase from one another, for directional discrimination and electrical division of detection signals, are formed at both sides of the second grating 14, and a chromium deposited surface 50 surrounds the both gratings, for preventing a hindrance such as a disturbance light. Incidentally, the arrangement of the phase A, phase B, phase $\overline{A}$ and phase $\overline{B}$ is not limited to the example in FIG. 7 and the arrangements shown in FIGS. 8, 9 and other arrangements may be adopted. Furthermore, when only the directional discrimination is needed and the phase division is not needed, two phases may be adopted.

Figure 10:
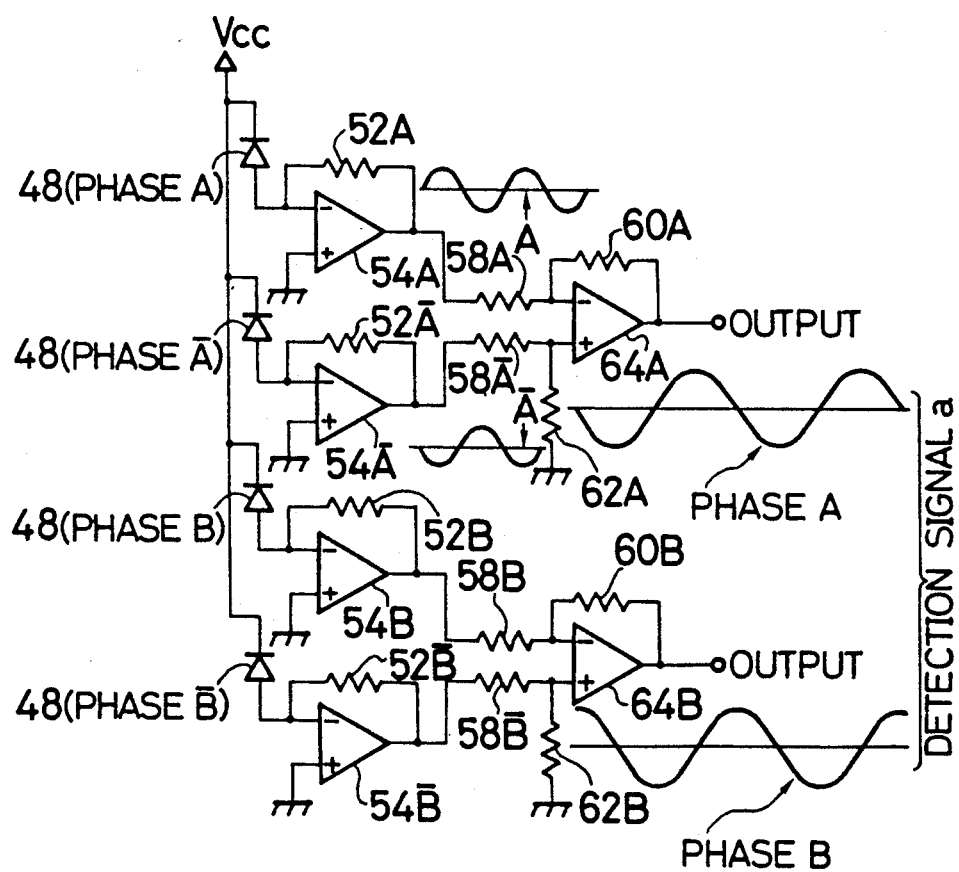
FIG. 10 is a circuit diagram showing the basic arrangement of a signal processing circuit of the above embodiment.
Figure 11:
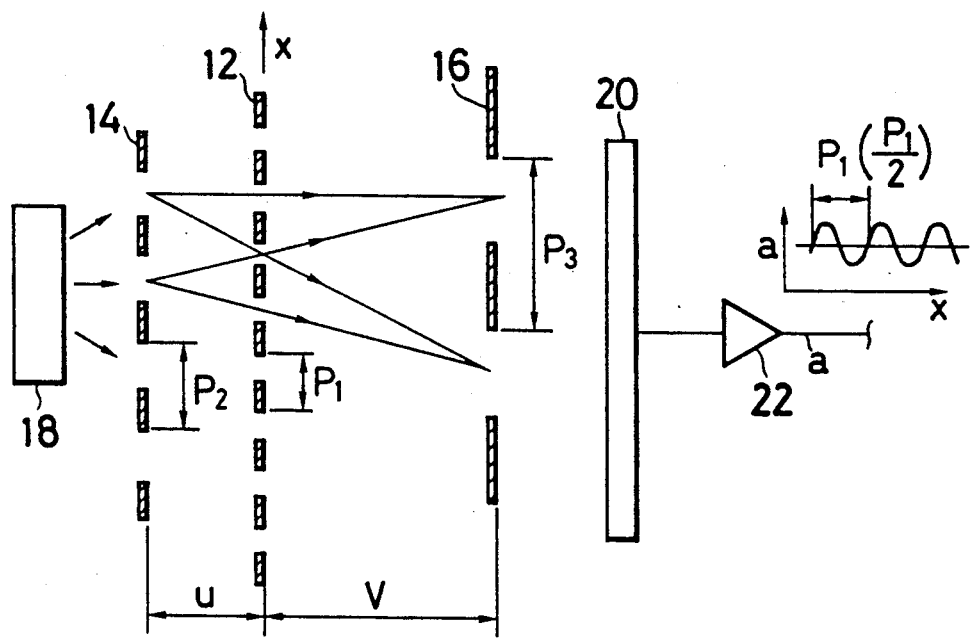
FIG. 11 is a schematic view of the arrangement of the conventional optical encoder of the three grating system.
Figure 12:
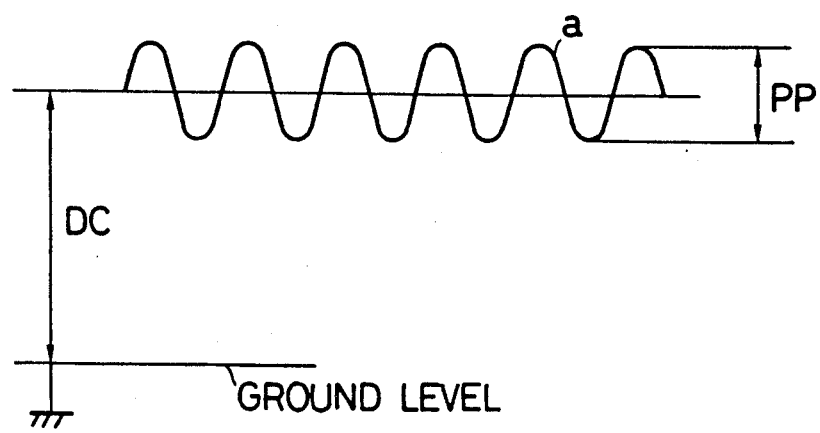
FIG. 12 is a chart showing the definition of the SN ratio of a detection signal.

As shown in FIG. 10, a circuit for processing outputs from the light receiving elements 48 to form two phase detection signals a having a phase A and a phase B, respectively, which are different by 90° in phase from each other includes:

resistors 52A 52$\overline{A}$, 52B and 52$\overline{B}$ and operational amplifiers 54A, 54$\overline{A}$, 54B and 54$\overline{B}$ for amplifying the outputs of a phase A, a phase $\overline{A}$, a phase B and a phase $\overline{B}$ from the light receiving elements 48; and resistors 58A, 58$\overline{A}$ 58B, 58$\overline{B}$, 60A, 60B, 62A and 62B and operational amplifiers 64A and 64B for differentially amplifying an outer of a phase A and an output of a phase $\overline{A}$, or an output of a phase B and an output of a phase $\overline{B}$, respectively, to form an output of a phase A or an output of a phase B.

With the geometric system being adopted, in this first embodiment, the length of the dark portion 14A of the second grating 14 is set at 60 $\mu$m, the length of the light portion 14B of the second grating 14 is 20 $\mu$m, the grating pitch P2 is 80 $\mu$m. The length of the dark portion 12A of the first grating 12 is set at 10 $\mu$m, the length of the light portion 12B of the first grating 12 is 10 $\mu$m, the grating pitch P1 is 20 $\mu$m, the length of the dark portion of the third grating 16 is 20 $\mu$m, the length of the light portion of the third grating 16 is 20 $\mu$m, and the grating pitch P3 is 40 $\mu$m. The grating gap u=d is set at 0.7–6 mm when a refractive index of glass is corrected and converted into air.

When the SN ratio of the direction signal obtained by this first embodiment was searched experimentally, as has been described, the SN ratio became 30.4%, so that it was ascertained that the SN ratio of the first embodiment was improved to a valve about twice that in the conventional example having the arrangement corresponding to the first embodiment.

The second embodiment of the present invention, wherein the present invention is applied to the reflection type optical encoder of the diffractive system will hereunder be described.

In this second embodiment, the length of the dark portion 14A of the second grating 14 is set at 60 $\mu$m, the length of the light portion 14B of the second grating 14 is 20 $\mu$m, the grating pitch P2 is 80 $\mu$m, the length of the dark portion of the first grating 12 is 20 $\mu$m, the length of the light portion of the first grating 12 is 20 $\mu$m, the grating pitch P1 is 40 $\mu$m, the length of the dark portion of the third grating 16 is 20 $\mu$m, the length of the light portion of the third grating 16 is 20 $\mu$m and the grating pitch P3 is 40 $\mu$m. The grating gap u=v=d=0.5 mm or more.

Other respects of the arrangement are similar to those in the first embodiment, so that description will be omitted.

In this second embodiment, similarly to the first embodiment, it was ascertained that the SN ratio was improved to a value about twice that of the corresponding conventional example.

Incidentally, in the above respective embodiments, the present invention has been applied to the reflection type optical encoder including the main scale 40 made of glass, however, the scope of application of the present invention is not limited to this, and it is clear that the present invention is applicable to the reflection type optical encoder having the reflection type main scale made of metal, and to the transmission type optical encoder having the transmission type main scale made of glass, wherein the second grating 14 and the third grating 16 are formed into two scales disposed on the both sides of the main scale (the first grating 12) as shown in FIGS. 1 to 4.

Furthermore, in the above respective embodiments, the present invention has been applied to the linear encoder, however, the scope of application of the present invention is not limited to this, and it is clear that the present invention is similarly applicable to a rotary encoder.

What is claimed is:

1. A reflection type optical encoder comprising:

a reflection type first scale fixed to one of two relatively movable members and formed with a first grating;

the other of the two relatively movable members including a light source for emitting an uncollimated illuminating light; a second scale formed with a second grating for partially shielding the illuminating light from said light source and illuminating the first grating and a plurality of third gratings different in phase from one another and separated from the second grating, for further restricting the illuminating light which has been restricted by the second and the first gratings; and a plurality of light receiving elements for detecting the illuminating light which has been restricted by the first to the respective third gratings, respectively;

wherein a relative displacement between the relatively movable members is detected from a periodic variation of detection signals from said light receiving elements.

2. A reflection type optical encoder as set forth in claim 1, wherein a pitch P2 of the second grating is set at a value larger than a pitch P1 of the first grating, and the length of a light transmitting portion of the second grating is set at a value not greater than the pitch P1 of the first grating.

3. The reflection type optical encoder of claim 2, wherein the length of the light transmitting portion of the second grating is set at a value equal to the pitch P1 of the first grating.

4. An optical encoder comprising:

a first scale fixed to one of two relatively movable members and formed with a first grating;

the other of the two relatively movable members including a light source for emitting an uncollimated illuminating light; a second grating integrated with said light source to form an array shaped light source which illuminates the first grating; a second scale formed with a third grating for further restricting the illuminating light which has been restricted by the second and first gratings; and a light receiving element for detecting the illuminating light which has been restricted by the first to third gratings;

wherein a relative displacement between the relatively movable members is detected from a periodic variation of a detection signal from said light receiving element, and a pitch P2 of the second grating is set at a value larger than a pitch P1 of the first grating and a length of a light transmitting portion of the second grating is set at a value no greater than the length of the pitch P1 of the first grating to improve a signal to noise ratio of the detection signal.

* * * * *